United States Patent Office 3,158,684
Patented Nov. 24, 1964

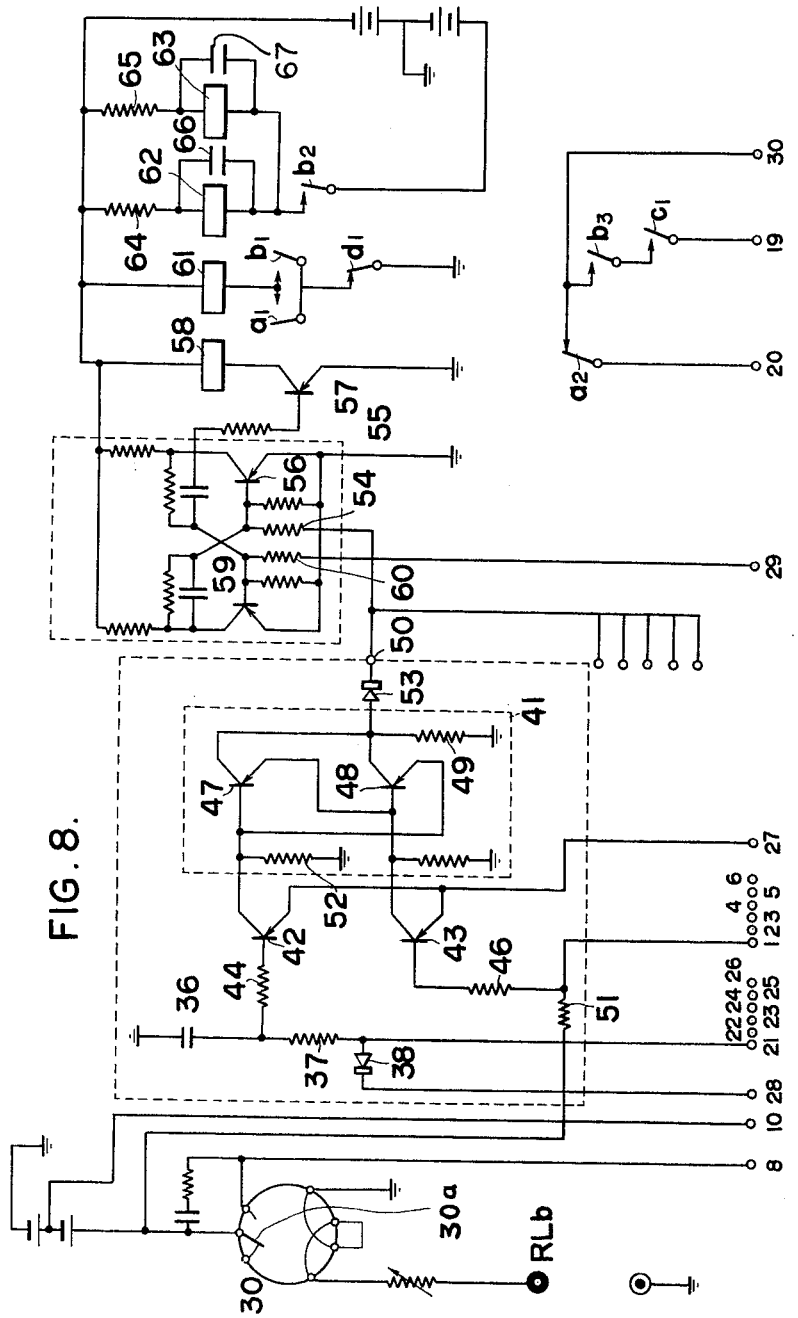

3,158,684
SYSTEM FOR DETECTING PERFORATION ERRORS IN SYNCHRONOUS PRINTING TELEGRAPHIC APPARATUS
Sanjiro Maejima, % Fuji Denki Seiko Co., Ltd., 182 2-chome, Omori, Ota-ku, Tokyo, Japan
Filed Oct. 13, 1961, Ser. No. 144,988
Claims priority, application Japan Dec. 28, 1960
2 Claims. (Cl. 178—23)

The present invention relates to an improved system for detecting error perforations in synchronous printing telegraphic apparatus, and more particularly to a system for detecting perforations errors caused by any apparatus failure during transmission of signal codes by data tape between transmitting set and receiving set and for stopping said transmission when said error is detected.

In the conventional no-error character transmitting apparatuses, improvements are substantially directed toward elimination of errors in the transmission line, so that said apparatuses have various disadvantages such as occurrence of reading-out error, error perforation in the receiving punching device and the like, and tendency of the apparatuses to become large in dimensions, high in price, and complicated in handling.

It is an essential object of this invention to provide an improved system as described in the first paragraph which does not have the above-mentioned disadvantages.

It is another object of this invention to provide an improved system as described above wherein, since erroneous operations of transmitting and receiving sets as well as errors in the transmission line can be effectively detected, very precise transmission of information by means of data tape can be achieved.

It is a further object of this invention to provide an improved system as described above wherein the number of mechanical elements is minimized, and the assembled apparatus is made to be compact by adoption of an optical system and electronic circuits.

The novel features of the characteristic of this invention are set forth with particularity in the appended claims. This invention itself, however, both as to its organization, manner of construction, and method of operation, together with further objects and advantages thereof, may best be understood by reference to the following description, taken in connection with the accompanying drawings, in which the same and equivalent members are designated by the same reference numerals and characters, and in which:

FIG. 8 is a connection diagram of the detecting circuit of the embodiment of FIG. 1, the terminals of FIG. 8 and FIG. 1 having the same reference numerals being connected to one another.

Figure 1:
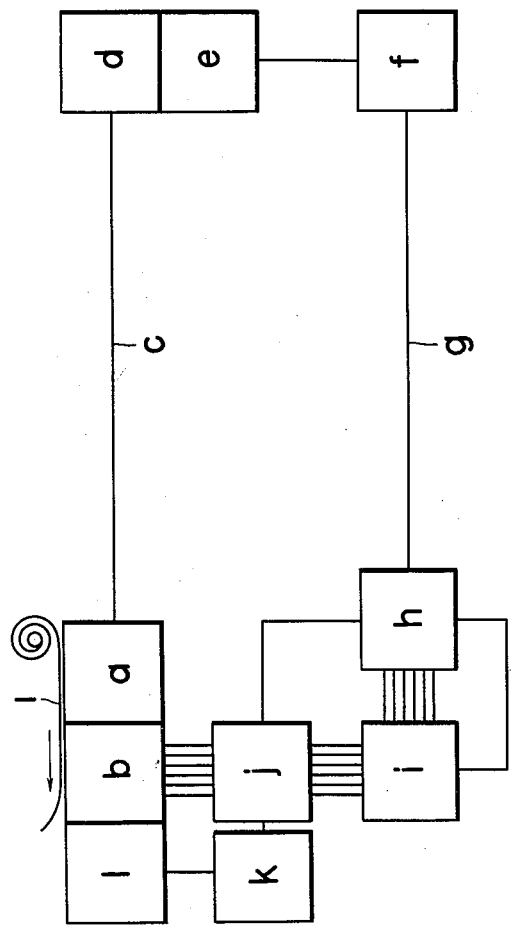
FIG. 1 is a block diagram, showing diagrammatically one embodiment of this invention.
Figure 2:
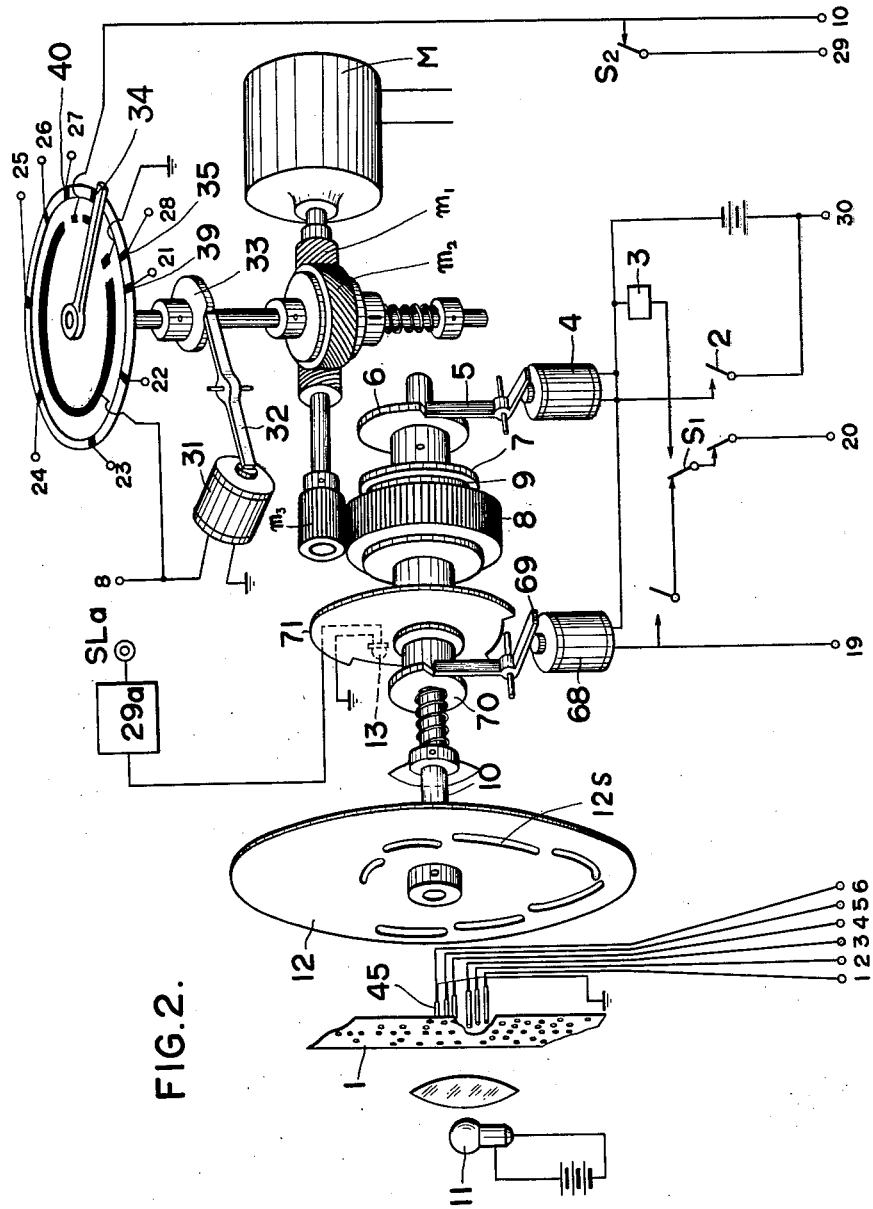
FIG. 2 is a perspective view of a transmitting set of the embodiment of FIG. 1.
Figure 3:
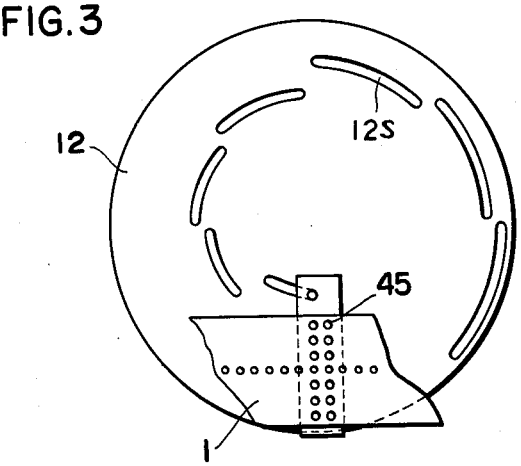
FIG. 3 is a front view of a distributing disk of the set of FIG. 2.
Figure 4:
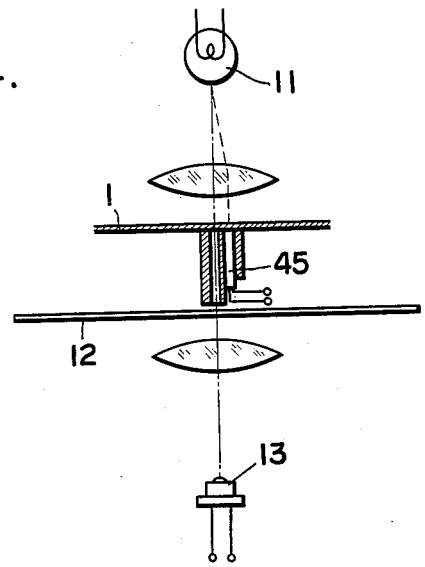
FIG. 4 is a plan view, in section along line IV—IV in FIG. 2.

Referring to FIG. 1, the reading-out part of a transmission tape 1 at the transmitting set consists of a series code reading-out part (a) and a parallel code reading-out part (b), and the signal current produced at said series code reading-out part (a) is transmitted into a transmission line c.

When transmission of codes corresponding to one character has been completed, the tape is shifted by a distance corresponding to said one character by means of a tape feeding mechanism, whereby code perforations are shifted to the parallel code reading-out part (b) in the direction of the arrow, and the series code reading-out part (a) is prepared to read out and transmit the next codes. In this case, in the receiving set, code selection is carried out by means of a receiving selector in accordance with the signal current transmitted by way of the transmission line c, and perforation of the receiving tap is carried out by a punching device d. At the same time the same codes are read out by the operation of a reading-out device e provided on said punching device d.

However, since these read-out codes are generally distorted, these codes are rectified in a code rectification circuit f and then transmitted back through a transmission line g.

The code current which has been transmitted back is converted to parallel codes by means of a distributing device h and then memorized in a memory circuit i, said device and circuit being provided at the transmitting set. Upon the memorization of the codes corresponding to one character, the memorized parallel codes and the codes read out by the parallel code reading-out part (a) are compared with each other in a comparing circuit j. If it is confirmed by said comparing circuit j that there is no code error, said memorized codes are erased, and the next memorization is commenced. If, however, the said compared codes are different, a pulse current is sent out from said comparing circuit j, whereby operation of a clutch control circuit k provided at the transmitting set is reversed, thereby stopping tape transmission by controlling the clutch l of the transmitting set.

The above operation of the system will be described in more detail in connection with FIG. 2 to 8.

After a transmission tape 1 has been put in the transmitting set, a starting button 2 is depressed. Then, a relay 3 is made to operate, whereby a contact s, is closed, so that the excited state of said relay 3 is self held even when said push button 2 is released.

Figure 5:
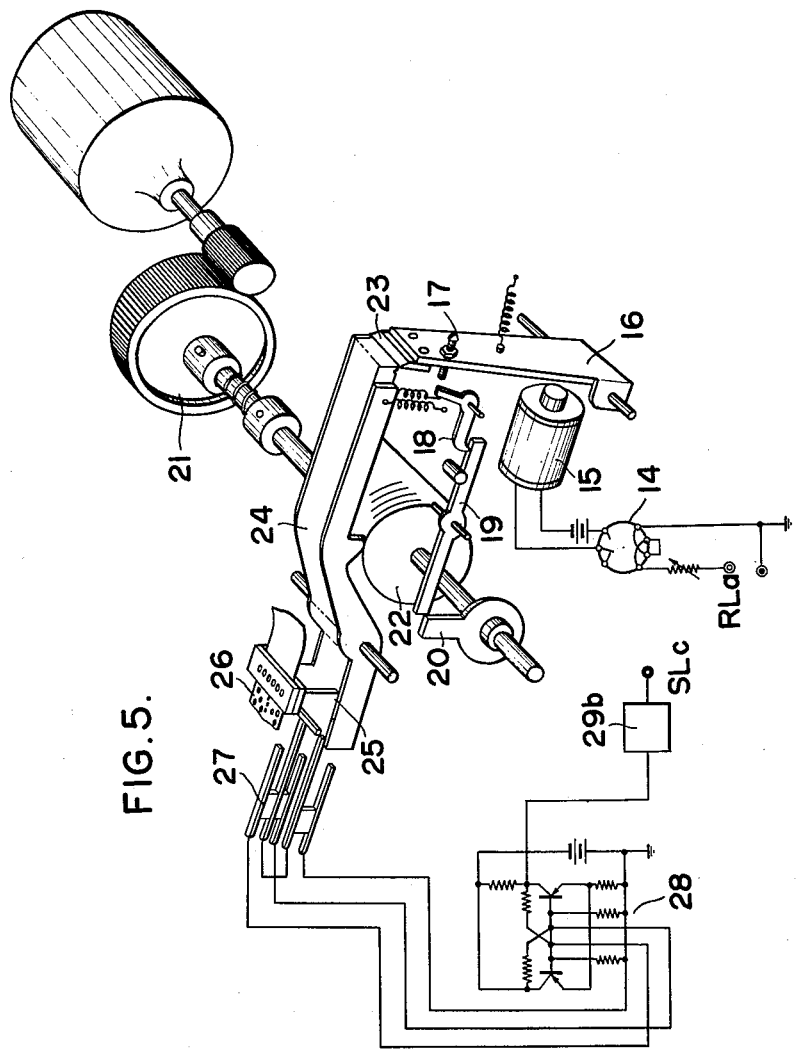
FIG. 5 is a perspective view of a receiving set of this invention.
Figure 6:
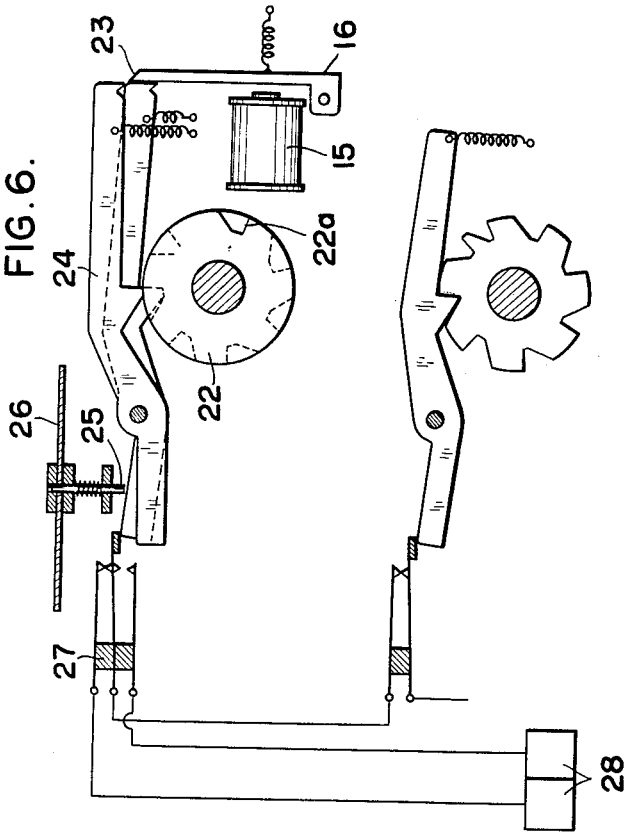
FIG. 6 is a side elevational view of a punching, device of the receiving set of FIG. 5.
Figure 7:
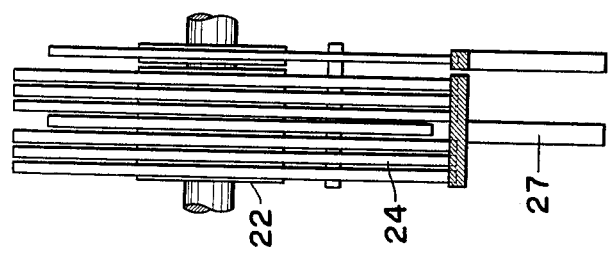
FIG. 7 is a plan view of the device of FIG. 6.

By the excitation of said relay 3, a clutch-magnet 4 is also excited, and an armature 5 thereof is attracted so as to detach from an arresting cam 6, whereby a main shaft 10 is made to rotate through a friction clutch 9 inserted between a friction disk 7 attached to the shaft of said cam 6 and a friction gear 8 driven by an electric motor M through a pinion $m_3$ attached to the shaft of said motor and coupled with said main shaft 10. In this condition, a light beam projected from an electric lamp 11 is made to pass successively, through code perforations of six units punched in the transmitting tape 1, at equal intervals of time in the order from the first unit to the sixth unit, and then is made to pass successively through six arcuate slits 12S having the same central angle and provided on a distributing disk 12 attached to the extreme end of the main shaft 10 and rotated by said shaft, whereby six impulse currents are produced through a phototransistor 13. On the other hand, a starting pulse current for synchronizing the transmitting and receiving sets and a stop pulse current are necessary so that codes corresponding to one character consist of eight pulse currents. The signal currents produced in this manner are sent out of the circuit terminals SLa after passing through a direct current amplifier 29a and then supplied to the receiving set. In the receiving set, as shown in FIG. 5, the exciting coil of a polarized relay 14 is excited by a signal current sent from the circuit terminals RLa, thereby operating a toggle switch inserted in the circuit of a selectormagnet 15. When a pulse current is made to pass through a selectormagnet 15 by a starting pulse current, an armature 16 is attracted by said selectormagnet, and the end of a bell crank 18 is depressed by the end of an adjusting screw 17 provided on said armature 16, whereby the stop lever 19 is pushed clockwise as viewed in the drawing, and the end of the stop lever 19 is disengaged from the arresting cam 20. Upon said disengagement, the selector cams 22 are made to rotate by means of a friction clutch 21, and a selector lever 24 is selected, through the movements of the armature extension 23 and selector cams 22, by the following six signal currents, whereby punching pins 25 (FIG. 6) are pushed up and carry out punching on the receiving tape 26.

Each of the selector cams 22 is provided with a recess 22a (FIG. 6), and these six selector cams are parallelly affixed to each other. Each selector level 24 is in contact with a respective selector cam 22 and is dropped into the recess 22a thereof per rotation of said cam so as to push up a punch pin 25, thus punching on the receiving tape 26. However, if there is a signal current at the time when the selector lever 24 is made to drop in the recess 22a of the selector cam 22, the selector lever 24 is locked against dropping by the armature extension 23, whereby punching of the receiving tape 26 is not carried out.

When the selector lever 24 has dropped, and the receiving tape 26 has been punched, contacts 27 capable of operating in response to said dropping of the selector lever 24 are closed, thus producing a pulse current having the same code as the code obtained by said punching. This pulse current continues for a very short time, because the contact time of the contacts 27 is very short, so that said pulse current is rectified by means of a flip-flop circuit 28 and then amplified by a direct current amplifier 29b. This amplified output current is fed back from the transmission circuit terminals SLb into the transmission line g.

The code current fed back as stated above through the transmission line g enters into the coil of a polarized relay 30 from the transmission circuit terminals RLb, thus actuating the switch 30a thereof.

Upon the operation of said switch 30a, a current is made to pass through a selector-magnet 31 by the starting mark current, whereby the stop lever 32 is disengaged from the arresting cam 33 and the brush 34 is made to rotate by a driving shaft of a worm wheel $m_2$ meshed with a worm gear $m_1$ attached to the shaft of the motor M. When the brush 34 reaches the position corresponding to a segment 35, the condenser 36 is grounded through a resistor 37 and a diode 38, whereby the condenser 36 is discharged and becomes of zero potential.

Since the brush 34 is rotated synchronously with the cam 33, when the brush 34 reaches and contacts the segment 39, the first code unit appears. If this code unit corresponds to a space current, this current charges the condenser 36 through a resistor 37, but if said code unit corresponds to no-current, said charging of the condenser 36 is not achieved. Similar charging and non-charging of the condenser 36 are carried out until six units of codes are scanned, whereby the signal current which has been fed back is memorized. When the brush 34 reaches a segment 40, the codes memorized on the transmission tape 1 and codes memorized in the condenser 36 are compared by a comparison circuit 41. That is, if it is assumed that the transistors 42 and 43 are supplied with emitter voltage, and the condenser 36 has not yet been charged with any signal current, then the base current of the transistor 42 will flow into the condenser 36 through a resistor 44, so that the normal bias resistance between the emitter and collector of the said transistor 42 becomes low, thus producing a collector current thereof.

However, when transmission of codes corresponding to one character has been completed by one rotation of the code distributing disk 12 of the transmitting set, the tape transferring mechanism operates to shaft the transmission tape 1 by a distance corresponding to one character. Then, the character which has completed sending of the codes memorized on the condenser 36 reaches the six phototransistors 45, and on the phototransistor 45 located at the position where the transmission tape 1 has character perforations is projected a light beam through said character perforations, whereby the internal resistance of said phototransistor 45 becomes lower, and the base of the transistor 43 is biased in the normal direction through a resistor 46 and the said phototransistor 45, thus decreasing the resistance between the emitter and collector of said phototransistor 43 and producing a collector current thereof.

In such a manner as described above, the same potential is applied across the emitter and base of each of the transistors 47 and 48, whereby the circuit between the emitter and collector of each said transistor offers a high resistance, and the collector current thereof becomes almost zero, so that a potential difference does not exist between the terminals of the load resistance 49, and no output voltage is produced at the output terminals 50. On the other hand, when the condenser 36 is in a charged state, its charged voltage is higher than the emitter voltage of the transistor 42, so that no base current and no collector current flow through said transistor 42.

When the phototransistor 45 is shielded by the transmission tape 1, and its internal resistance is high, an electric voltage higher than the emitter voltage is applied, by way of a resistance 51, to the base of the transistor 43, whereby the collector current of said transistor 43 becomes zero. In this state, since the outputs of the opposite phototransistors 42 and 43 are zero, the input and output of the transistors 47 and 48 are zero. However, when the condenser 36 is in a charged state, the transistor 42 is reversely biased, and a collector current of said transistor is flowing, a light beam is projected on the phototransistor 45 through the perforations of the transmission tape 1, whereby the internal resistance of said terminals 45 becomes low, thus biasing the transistor 43 and producing a collector current thereof. Then, successively, an electric voltage is impressed on the emitter of the transistor 47 the base of which is biased through a resistance 52, and a potential difference is produced across the two terminals of a load resistor 49 by the collector current, thus producing an output voltage between the output terminals.

Even when operation of the condenser 36 is opposite to that of the phototransistor 45, an output voltage will be similarly produced. That is, since the transistor 42 is controlled by the charging and discharging of the condenser 36, and the transistor 43 is controlled by the phototransistor 45, when both of the transistors 42 and 43 are in the same condition, no output is produced by the transistors 47 and 48, and an output would be produced by said transistors only if an abnormal condition occurs. The operations as stated above are carried out, similarly, in each of the six circuits corresponding to various code positions. In such a manner as described above, when all of the six circuits do not produce their outputs, that is, when the transmitted codes and the memorized codes are equal, the transmitting operation is continued. However, when said codes of two kinds are different, and an output is produced from any one or more of said six circuits, the output pulse current enters, through a resistor 54, into the base of the transistor 56 of the flip-flop circuit 55, whereby operation of said flip-flop circuit is reversed, the base of the transistor 57 is subjected to normal bias, and a relay 58 inserted in the collector circuit of said transistor is supplied with a current, thus opening the contacts $a_2$. Accordingly the self-held relay 3 is restored to its normal position and opens the exciting circuit of the electromagnet 4, whereby the armature 5 is opened, and rotation of the main shaft 10 is stopped by the engagement of said armature with the arresting cam 6. Simultaneously with the said stopping of the shaft 10, the contact $s_2$ is closed by the restoring of the relay 3, and the base of the transistor 59 in the flip-flop circuit 55 is reversely biased through a resistor 60, whereby said transistor 59 is restored to its normal state. On the other hand, the relay 61 is operated by the contact $a_1$, whereby the contact $b_1$ is closed and self held. During this time, the contacts $b_2$ and $b_3$ are also closed. By the closing of the contact $b_2$, the relays 62 and 63 are excited, but their operations are, respectively, delayed for a short time by the resistors 64, 65 and condensers 66, 67. Thus the condenser 66, in parallel connection with the relay 62, is charged through the resistor 64, thus increasing the voltage across the terminals of the relay 62. Upon the increase of the current passing through said relay 62 with the increase of said voltage of said relay, this relay operates to close the contact $c$, whereby the signal producing clutch-magnet 68 is excited and attracts its armature 69, thus disengaging said armature from the arresting cam 70. Accordingly, the signal producing disk 71 is made to rotate by the friction clutch 9 without relation to the main shaft 10. When said disk 71 rotates, its recess interrupts the light beam of the phototransistor 13, whereby signals are continuously sent out, thus sending said signals to the receiving side. Since the capacity of the condenser 67 in parallel connection with the relay 63 is large, the relay 63 operates with a time lag of about two seconds relative to the operation of the relay 62. By the operation of said relay 63, the contact $d_1$ in the circuit of the relay 61 is opened, and the relay 61 is restored, whereby the contacts $b_2$ and $b_3$ are opened. However, the relays 62 and 63 are restored with a time lag due to actions of the condensers 66 and 67, whereby the current of the clutch-magnet 68 is stopped, the signal producing disk 71 stops, and transmission of erroneous signal codes is stopped. The relay 62 acts to establish a time interval between the message codes and error signal codes.

While this invention has been described in connection with a particular embodiment thereof, it will, of course, be understood that this invention is not limited thereto, since many modifications may be made and this invention, therefore, is contemplated by the appended claims to cover all such modifications as fall within the true spirit and scope of this invention.

What is claimed is:

1. An apparatus for detecting errors in the groups of code perforations made in a tape in a synchronous printing telegraphic apparatus, said error detecting apparatus comprising a photoelectric device having a rotating disk and a light adapted to be positioned on opposite sides of the transmission tape of the telegraphic apparatus for sequentially scanning the number and position of light beams passing the punched hole positions in which the perforations of a group of code perforations are located on the transmission tape, said photoelectric device also having means for converting the series of light pulses passed through a group of code perforations in the transmission tape and through said rotating disk into a series of electric signals, means coupled to said photoelectric device for transmitting said series of electric signals, a receiving set receiving said series of electric signals, a punching mechanism coupled to said receiving set and actuated by said receiving set for punching a receiving tape with a group of perforations corresponding to the group of perforations on the transmission tape, a signal producing device coupled to said printing mechanism for producing a series of signals for the actions of the punching device in punching the group of perforations in the receiving tape, a memorizing device coupled to said signal producing device for receiving and memorizing the series of signals produced in response to the group of perforations punched in said receiving tape, a comparing device coupled to said photoelectric device and to said memory device for comparing the number and position of the light beams passed through the group of perforations in the transmission tape with the series of signals memorized by said memorizing device and producing a signal when there is a difference between the series and the number and position of the light beams, a clutch control means coupled to said photoelectric device through which said photoelectric device is driven, said clutch control means being coupled to said comparing device for being actuated to be disengaged when a signal is produced by said comparing device, and an erasing device coupled to said memory device for periodically erasing the series of signals memorized by said memory device.

2. An apparatus for detecting errors in the groups of code perforations made in a tape in a synchronous printing telegraphic apparatus, said error detecting apparatus comprising a device for sequentially detecting the positions on the transmission tape which have perforations of a group of code perforations punched therein, said device further having means for converting the number and position of the detected perforations into a series of electric signals, means coupled to said device for transmitting said series of electric signals, a receiving set receiving said series of electric signals, a punching mechanism coupled to said receiving set and actuated by said receiving set for punching a receiving tape with a group of perforations corresponding to the group of perforations on the transmission tape, a signal producing device for detecting the positions on the receiving tape which have perforations punched therein and converting the number and position of the detected perforations into a series of electric signals, a memorizing device coupled to said signal producing device for receiving and memorizing the series of signals produced in response to the group of perforations punched in said receiving tape, a comparing device coupled to said device for detecting holes in the transmission tape and to said memory device for comparing the number and position of the number and position of the detected perforations in the transmission tape with the series of signals memorized by said memorizing device and producing a signal when there is a difference between the series and the number and position of the perforations, a clutch control means coupled to said device for detecting holes in the transmission tape and through which clutch control means said device is driven, said clutch control means being coupled to said comparing device for being actuated to be disengaged when a signal is produced by said comparing device, and an erasing device coupled to said memory device for periodically erasing the series of signals memorized by said memory device.

References Cited in the file of this patent

UNITED STATES PATENTS

| 2,213,559 | Bryce | Sept. 3, 1940 |
| 2,235,755 | Baklser | Mar. 18, 1941 |
| 2,242,196 | Thompson | May 13, 1941 |

OTHER REFERENCES

Publication, "Intermittent-Feed Computer Tape Reader," by B. G. Welby, "Electronics," February 1953, p. 115.